United States Patent [19]

Leiber

[11] Patent Number: 4,674,805
[45] Date of Patent: Jun. 23, 1987

[54] BRAKE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 800,567

[22] Filed: Nov. 21, 1985

[30] Foreign Application Priority Data

Dec. 8, 1984 [DE] Fed. Rep. of Germany ....... 3444828

[51] Int. Cl.⁴ ............................................. B60T 8/10
[52] U.S. Cl. ..................................... 303/114; 303/95
[58] Field of Search ................. 60/545, 579, 580, 582; 303/113, 114, 115, 92, 95

[56] References Cited

U.S. PATENT DOCUMENTS

| 4,346,942 | 8/1982 | Leiber | 303/114 X |
| 4,354,714 | 10/1982 | Belart | 303/114 |
| 4,603,918 | 8/1986 | Leiber et al. | 303/114 |

Primary Examiner—Duane A. Reger
Attorney, Agent, or Firm—Edwin E. Greigg

[57] ABSTRACT

A brake booster, combined with an anti-skid apparatus for a master brake cylinder. The brake booster is controlled by a brake valve and has a first booster piston displaceable by a brake pedal via a tappet for emergency braking and hydraulically pressurizable for braking with brake boosting, and a second booster pinion, which is only hydraulically displaceable. With normal braking, both booster pistons operate simultaneously. In case of skidding the first booster piston is hydraulically fixed in its operative position during a first, low brake pressure reduction and the second booster piston is relieved of boost pressure and performs reductions in brake pressure. If these are not sufficient, the first booster piston is also displaced in the direction of its initial position. Whereby the first booster piston pressures against the tappet via a spring mounted between it and the tappet which, in turn, acts on the brake pedal. Dependent on the magnitude of the reduction in the brake pressure during the second brake pressure reduction, the displacements of the first booster piston are more or less and act via the spring on the brake pedal with greater or lesser force.

21 Claims, 2 Drawing Figures

BRAKE BOOSTER

BACKGROUND OF THE INVENTION

The invention is directed to a brake booster combined with an anti-skid apparatus as generally defined hereinafter. Such a brake booster with an anti-skid apparatus for the generation of brake pressure and automatic brake pressure modulation in intrinsically safe closed brake circuits was already proposed by the copending U.S. patent application Ser. No. 788,320 filed Oct. 17, 1985. By means of coupling its brake valve to the tappet and the booster piston the latter travels approximately the same distance as the tappet during brake boost, so that the displacement travel of the booster piston is generally proportional to brake pedal travel. If brake booster is not present, the booster piston is mechanically moved via the tappet. For the purpose of this the tappet first travels through a very short idle stroke occasioned for structural reasons which, for all practical purposes, cannot be felt in the brake pedal. After that the tappet and the booster piston travel equal distances so that, if brake boost is missing, the brake pedal travel connected with a certain brake pressure cannot be differentiated from that needed when brake boost is present. If there is danger of skidding, the booster piston is directed into the direction of the tappet by means of the valve arrangement which results, in the usual way, in reductions in the brake pressure, for instance down to a zero value. If the brake pressure losses exceed a preset value sudden very hard reactions of the brake pedal occur. This may irritate an unsure driver to the extent that he may decrease foot pressure on the brake pedal in a detrimental manner.

OBJECT AND SUMMARY OF THE INVENTION

The brake booster of the present invention, combined with an anti-skid apparatus, has the advantage that during brake boost a short pedal travel suffices for full braking and, on the other hand, the lack of brake boost is signaled to the driver by means of conspicuously longer brake pedal travel. Additionally, this brake booster also has the advantage that if one of the, for instance, two brake circuits is lost, the brake pedal drops to a lesser degree.

A further development revealed herein has the advantage that in case of anti-skid operation reactions on the brake pedal by means of the tappet only occur when the brake pedal has been used too strongly. These reactions are intended to cause the driver to reduce his actuation of the brake pedal. If, because of this, the reactions disappear there is still a sufficient amount of brake boost for the very shortest braking distances available.

Another advantage of this invention is that, if necessary, a switch from the first to the second brake pressure reduction step which causes greater pressure reduction takes place early and during generally equally high brake pressures.

Also another advantage of this invention is that reactions at the brake pedal occur even with small displacements of the first booster piston. This avoids sudden, hard reactions which might lead a scared driver to make mistakes.

Still another advantage of this invention is that reactions are felt more strongly the further the booster pressure controlled by way of the brake pedal lies above the threshold after which undue brake slippage occurs.

A further advantage lies in an inexpensive and, at the same time, space-saving construction. For instance, the plate spring can be disposed between the first booster piston and its tappet.

Still other advantages are that even brake pressure losses in the area of the first pressure reduction step are indicated to the driver via the brake pedal. The intensity of the indication can be selected via a length of travel controllable by a valve.

There is also disclosed herein that during normal braking with brake boost, both booster, pistons work simultaneously.

Further advantageous and space-saving orientations of the second booster pistons and their booster cylinders is disclosed in this application.

It is an advantage that during one or several times repeated first brake pressure reduction steps a reaction at the brake pedal occurs and that in so doing the first booster piston does not limit disadvantageously the movability of the second booster piston.

Finally, this application reveals how to make the anti-skid apparatus less expensive and make possible an increase in control speed of the brake booster in those cases where undue brake slippage or even the danger of skidding occurs.

The system furthermore is intrinsically safe, i.e. no additional components, such as monitors for the pressure supply are needed in order to shut off the anti-skid apparatus in case of error.

The invention will be better understood and further objects and advantages thereof will become more apparent from the ensuing detailed description of preferred embodiments taken in conjunction with the drawings.

Two exemplary embodiments of the brake booster with anti-skid apparatus in accordance with the present invention are shown in the drawings and are further described in the ensuing description.

DESCRIPTION OF THE PREFERRED EMBODIMENTS

Figure 1:
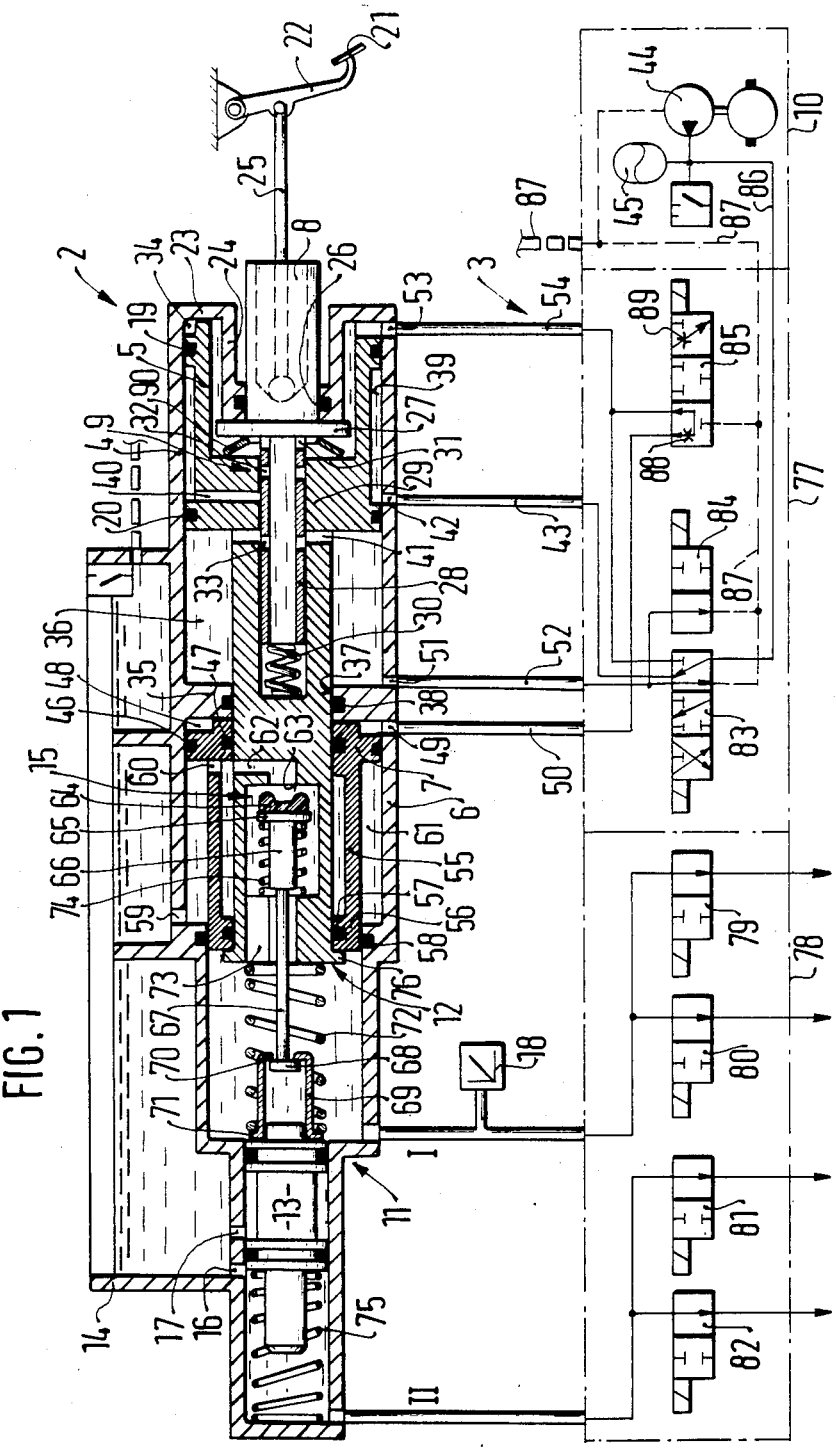
FIG. 1 shows a first exemplary embodiment of the brake booster in accordance with the present invention with an anti-skid apparatus in longitudinal cross section; and, FIG. 2 shows a second exemplary embodiment of the brake booster with anti-skid apparatus in longitudinal cross section.
Figure 2:
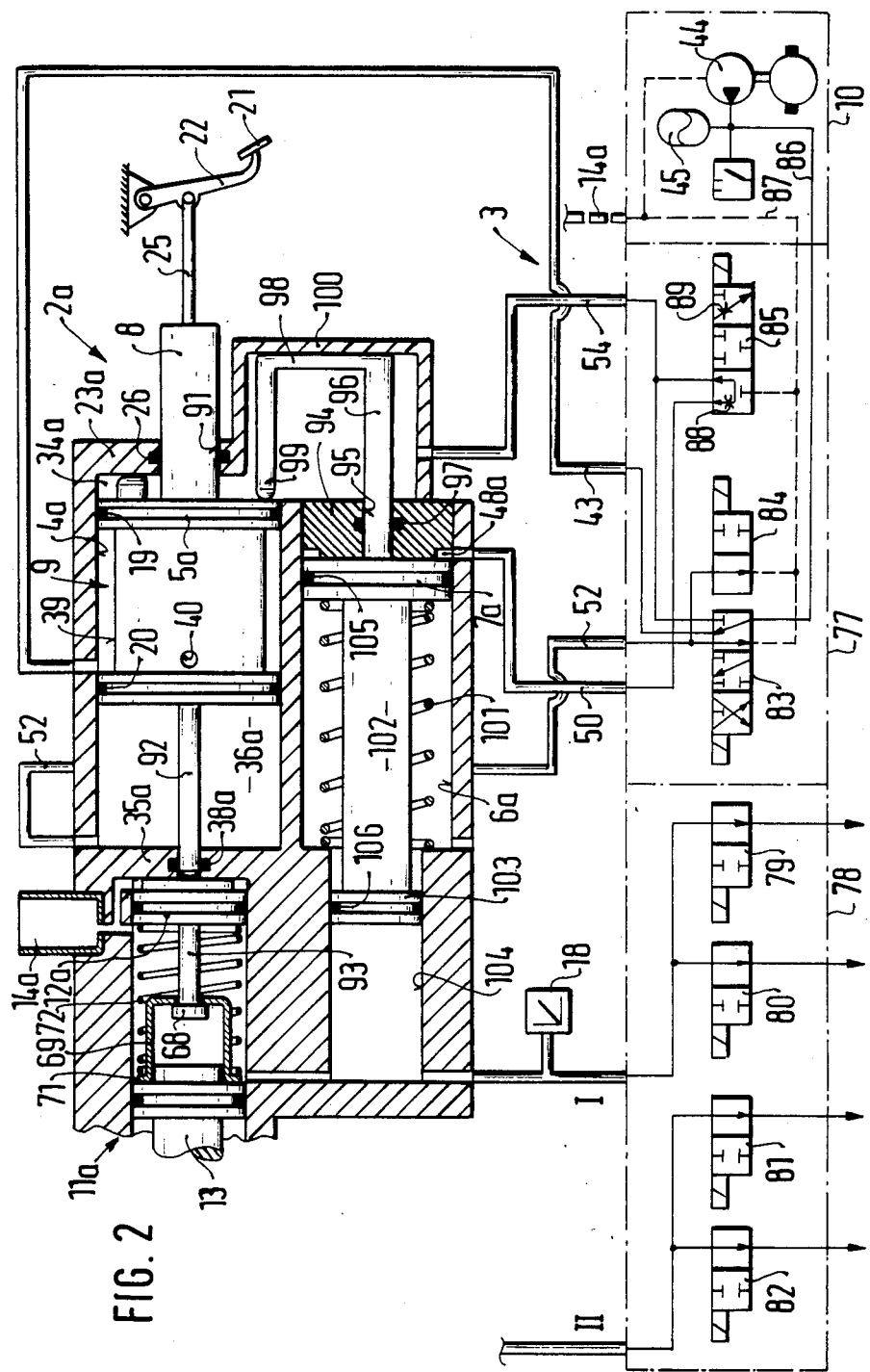

The first exemplary embodiment of the brake booster 2 in accordance with the present invention with an anti-skid apparatus 3 in accordance with FIG. 1 has a first booster cylinder 4, a first booster piston 5, a second booster cylinder 6, a second booster piston 7, a tappet 8 and a brake valve 9. The brake booster 2 is supplied via the anti-skid apparatus 3 by a pressure supply apparatus 10 and is connected with a master cylinder 11. The master cylinder 11 has a first master cylinder piston 12, a second master cylinder piston 13, a refill tank 14, a filler valve 15, refill openings 16, 17, two brake circuits I, II and a brake pressure sensor 18.

The first booster cylinder 4 contains the first booster piston 5, which is essentially cup-shaped and movable in a longitudinal direction. The first booster piston 5 has in the vicinity of its ends sealing rings 19, 20, which sealingly press against the first booster cylinder 4. At one end of the first booster cylinder 4 oriented toward a brake pedal lever 22 which supports a brake pedal 21, there is provided an end wall 23. Starting from this end wall 23 a sleeve 24 extends in the direction of the master cylinder 11. This sleeve 24 forms a support for the tappet 8, which is movable in the direction of the master cylinder 11 by means of the brake pedal 21 via the brake pedal lever 22 and a pedal rod 25. A sealing ring 26 is disposed in the sleeve 24 which sealingly surrounds the tappet 8. The tappet 8 is connected with a stop collar 27 located inside the first booster cylinder 4. The brake valve 9 has a tube-shaped control slide 28 oriented on the same axis as the tappet 8 and rigidly connected with it, that extends into the booster cylinder 4, as well as a control sleeve 29 combined in a single part with the first booster piston 5. A soft restoring spring 30 is disposed in such a manner that it urges the control slide 28 and the tappet 8 in the direction of the brake pedal lever 22 and the control sleeve 29 in the direction of the master cylinder 11. by pressing against master cylinder piston 12. The tube-shaped control slide 28 has equalizing bores 31 directly next to the stop collar 27. At a distance from these equalizing bores 31 and staggered in the direction of the master cylinder 11 there are first disposed inflow bores 32 and then relief bores 33. A first booster chamber 34 is formed between the first booster cylinder 4, the first booster piston 5 and the end wall 23. The first booster cylinder 4 is limited by an end wall 35 on the side towards the master cylinder. An auxiliary chamber 36 is located in the first booster chamber 4 between this end wall 35 and the first booster piston 5. The end wall 35 has coaxially with the first booster cylinder 4, a bore 37 through which extends the first master cylinder piston 12, formed cylindrically like a rod, and extends up to the first booster piston 5. A sealing ring 38, supported by the end wall 35, sealingly surrounds the first master cylinder piston 12. The master cylinder piston 12 is rigidly connected with the first booster piston 5 and is provided with outflow bores 41 extending perpendicular to the axis.

The first booster piston 5 has a circumferential groove 39 between sealing rings 19 and 20. A connecting bore 40 extends from this circumferential groove 39 to the tube-shaped control slide 28. The first booster cylinder 4 has a supply connection 42 next to the sealing ring 20 and coincidental with the circumferential groove 39 of the first booster piston 39. This supply connection 42 is connected with the pressure supply apparatus 10 via a line 43 which connects with the anti-skid apparatus 3. The pressure supply apparatus 10 is constructed in a known manner and has as necessary parts a pump 44 and a pressure reservoir 45 as well as a fluid supply means.

The first booster cylinder 4 and the second booster cylinder 6 are separated by the end wall 35. The second booster cylinder contains the second booster piston 7. The second booster piston 7 is disposed as an annular piston and has two sealing rings 46 and 57. The sealing ring 46 abuts against the inner wall of the second booster piston 6. The sealing ring 47 sealingly surrounds the rod-shaped first master cylinder 12. A second booster chamber 48 is formed between the second booster cylinder 6, the second booster piston 7 and the end wall 35. The chamber 48 has a connection 49 adjacent to the end wall 35. A line 50 leads from this connection 49 to the anti-skid apparatus 3. On the pedal side of the end wall 35, the auxiliary chamber 36 has a connection 51 which also connected with the anti-skid apparatus 3 via a line 52. The first booster chamber 34 also has adjacent to the end wall 23 a connection 53 which is connected via a line 54 with the anti-skid apparatus 3.

A pump piston 56 is connected with the second booster piston 7 via a tube-like connecting piece 55. The pump piston 56 is also disposed as an annular piston and has a sealing ring 57 sealingly surrounding the first master cylinder piston 12. The master cylinder 11 has an additional sealing ring 58 sealingly surrounding the pump piston 56 or, when this is displaced, the tube-like conection piece 55 having the same diameter as the pump piston 56. In the vicinity of the sealing ring 58 the second booster cylinder 6 has a connecting bore 59 open to the refill tank 14. The tube-like connecting piece 55 is provided with a transverse bore 60 adjacent to the second booster piston 7, so that an annular chamber 61, limited in radial directions by the second booster cylinder 6 and the first master cylinder piston 12 and in axial directions by the second booster piston 7 and the sealing ring 58, communicate with the refill tank 14. The filler valve 15 communicates with this annular chamber 61 via a conduit 62. The conduit 62 terminates at a valve seat 63 of the filler valve 15. Opposite the valve seat 63 is located a closing element 64 which is fastened by means of a supporting disk 65 on a rod 66 which continues as a smaller diameter stem 67 having a head 68 at its end. The head 68 is located inside a cylindrical casing 69 having an inwardly-facing collar 70 surrounding the stem 67 with play. Additionally, the cylindrical casing 69 has a flange 71 extending radially outwardly that abuts the second master cylinder piston 13. A spreading spring 72 is mounted between this flange 71 and a collar on the end of the first master cylinder piston 12. Inside the first master cylinder piston 12 is disposed at least one stop dog 73. This stop dog 73, the rod 66, the stem 67, the head 68 and the cylindrical casing 69 limit the expandibility of the spreading spring 72. A pre-stressed closing spring 74 is mounted between the at least one stop dog 73 and the support disk 65 and surrounds the rod 66 at a radial distance. A restoring spring 75 is mounted in the master cylinder 11 and urges the second master cylinder piston 13 in the direction of the first master cylinder piston 12. Because of the action of the restoring spring 75 and when the brake pedal 21 is not actuated, the second master cylinder piston 13 moves into a position in which the refill opening 16 connects the refill tank 14 and brake circuit II. The first master cylinder piston 12 has a collar 76 serving as a clutch means which radially extends away from the first master cylinder piston 12 between the pump piston 56 and the spreading spring 72. This collar 76 makes it possible that the restoring spring 75 and the spreading spring 72 can move the pump piston 56 and associated second booster piston 7 into an initial position via the first master cylinder piston. This initial position is determined by the end wall 35 forming an axial stop. As a constructional equivalent of the collar 76 a ring, for instance, could be fastened on the first master cylinder 12.

The anti-skid apparatus 3 has a first valve arrangement 77 and a second valve arrangement 78. The second valve arrangement 78 contains, for instance, four brake pressure maintenance valves 79 to 82. These brake pressure maintenance valves 79 to 82 are formed as 2/2-way valves and are open in their normal position. They thereby connect the master cylinder 11 with wheel brakes not shown. The first valve arrangement 77 contains a 5/3-way valve 83, a 2/2-way valve 84 and a 3/3-way valve 85.

The 5/3-way valve 83 is connected via a pressure supply line 86 with the pump 44 and via a return line 87 again with the pump 44 of the pressure supply apparatus 10. Furthermore, this 5/3-way valve 83 is connected with lines 43, 52 and 54. The 2/2-way valve 84 is disposed as a bypass to the 5/3-way valve and open in its normal position. This way it connects the line 52 with the return line 87. This 2/2-way valve 84 forms a safety bypass for the 5/3-way valve 83 in the event this valve 83 might hang up in any one of its three positions. The 3/3-way valve in its normal position connects the line 54 with the line 50. In a first control position the lines 50, 54 and 87 are disconnected from each other. In a third control position the line 54 is disconnected, while the line 50 is connected with the return line 87. Throttles 88 and 89 are associated with the 3/3-way valve 85 in its normal and its second control position.

A spring 90 is mounted between the first booster piston 5 and the stop collar 27. The spring 90 surrounds the control sleeve 28 at a radial distance and is, for instance, formed as a plate spring with strong progressive characteristics.

Mode of Operation of the first Exemplary Embodiment

If the pressure supply apparatus 10 is disconnected and its pressure reservoir 45 is empty, braking without brake boost can be performed. To accomplish this the tappet 8 is moved in the direction of the master brake cylinder 11 by means of the brake pedal 21 via the brake pedal lever 22 and the pedal rod 25. If sufficiently displaced, the stop collar secured to the tappet 8 presses against the spring 90 and acts by way of spring 90 on the first booster piston 5. The first booster piston 5 presses against the first master cylinder piston 12 which moves in the direction of the second master cylinder piston 13 when the first booster piston 5 is displaced. The spreading spring 72 also displaces the second master cylinder piston 13, so that the piston 13 covers the refill opening 16 and thereby closes the brake circuit II in respect to the refill tank 14. A pressure build-up occurs in the brake circuit II offering increasing resistance to the spreading spring 72 so that this spring 72 is elastically compressed. As a result of this compression, the closing spring 74 is actuated, thus pushing the closing element 64 against the valve seat 63. By means of this the second brake circuit I is also closed in respect to the refill reservoir 14. Further displacement of the brake pedal leads to further displacement of the first master cylinder piston 12, whereby it creates increasing brake pressure in the brake circuits I and II. As already described, the brake circuits I and II terminate at the wheel brakes via the lines through valves 79–82 denoted by the arrows. These convert brake pressure to braking forces. In order to obtain braking forces of the desired magnitude, a stroke of the brake pedal 21 is needed which is mainly dependent on the capacity of the wheel brakes, the elasticity of the enclosed pressure medium and the cross-sectional area of the first master cylinder piston 12. The cross-sectional area of this first master cylinder piston 12 and the dimensions of the brake pedal lever 22 have been selected so that the actuation of the brake pedal 21 makes possible the creation of sufficiently large brake pressures in the brake circuits I and II for emergency braking. When this brake pressure is created, the brake pressure obtained in the brake circuit I acts on the pump piston 56, so that it pushes the second booster piston 7 against the end wall 35. When braking without brake boost, the displacement force necessary to build up brake pressure in the master cylinder 11 is created only by means of the brake pedal 21 via the master cylinder piston 12. Since, especially with the use of disk brakes in heavy vehicles, to create the displacement force with the cross-section provided for emergency braking of the first master cylinder piston 12, undesired long displacement travel of this piston 12 is necessary, the brake pedal 2 travels a relatively long distance. It will be shown in the following part describing the function why shorter brake pedal travel suffices with brake boosting.

If the pressure supply apparatus 10 is connected and sufficient pressure is available, the pump effort necessary for braking is made by means of the brake booster 2. In the normal position of the brake pedal 21 the restoring spring 30 assures that the stop collar 27 on tappet 8 has a sufficient axial distance from the booster piston 5 so that the control slide 28 closes the connecting bore 40 and the relief bores 33 and the outflow bores 41 overlap. By this the first booster chamber 34 is connected with the auxiliary chamber 36 via the equalizing bores 31, the control slide 28, the relief bores 33 and the outflow bores 41. The auxiliary chamber 36 itself is connected via the line 52 and the 5/3-way valve 83 and the return line 87 with the refill tank 14 as well as with the inlet of the pump 44 and thereby is balanced. Actuation of the brake pedal 21 first results in a displacement of the control slide 28 via the tappet 8 in such a way that the relief bores 33 move away from the outflow bores 41 and the control slide 28 closes the outflow bores 41. Then an inflow bore 32 is brought into alignment with the connecting bore 40 so that pressure medium flows from the pressure supply apparatus 10 via the line 86 and the 5/3-way valve 83 as well as the line 43 into the control slide 28 and from there through the equalizing bores 31 into the first booster chamber 34. Part of the inflowing pressure medium flows via the line 54 and the 3/3-way valve 85 and the line 50 into the second booster chamber 48 and urges the second booster piston 7 in the direction of the second master cylinder piston 13. The acted-upon area of the first booster piston 5 and the cross-sectional area of the first master cylinder piston 12 create a first pressure transmitting ratio. The hydraulically active areas of the second booster piston 7 and of the pump piston 56 result in a second pressure transmission ratio. The hydraulically active areas of the second booster piston 7 and of its pump piston 56 are coordinated in such a manner that, based on the pressure created by means of the brake valve 9, a larger pressure transmission than that at the first master cylinder piston 12 occurs. This intentionally results in the pump piston 56 being able to overcome a stronger counter-pressure than the first master cylinder piston 12. Because of this, the pump piston 56 attempts to get ahead of the first master cylinder piston 12 and thereby encounters the collar 76. Therefore the collar 76 couples the pump piston 56 with the first master cylinder piston 12 in the case where booster pressure is supplied to both booster cylinders 4 and 6. If the booster pressure is further increased both said pistons move synchronously and thus together push pressure medium into the brake circuits I and II from the master cylinder 11. Therefore it becomes clear that with an equal stroke of the first master cylinder piston 12 more pressure medium is pushed into the brake circuits as in the first described functional example wherein the master cylinder piston 12 alone is displaced by foot power only by means of the brake pedal 21. To create a certain brake pressure in the brake circuits I and II during operation with brake boost, the first master cylinder piston 12 therefore requires a shorter displacement travel than during operation without brake boost. Accordingly the travel required by the brake pedal 21 is conspicuously shorter. The difference between the short brake pedal travel during brake boost and the longer brake pedal travel during loss of brake boost is called transmission jump, as previously noted. This transmission jump also has the advantage that in case of loss of one of the two brake circuits I or II the brake pedal does not drop too far in case of brake boost.

To finish braking, the brake pedal 21 is displaced in the direction of its normal position. By means of this the control slide 28 and the control sleeve 29 first take up positions in which the connecting bore 40 is blocked. Then the relief bores 33 overlap the outflow bores 41 so that both booster chambers 34 and 36 are balanced. This results in the first master cylinder piston 12 and the associated pump piston 56 moving into their original positions because of which the brake pressures in the brake circuits I and II decrease.

If the brake pedal 21 is actuated too vigorously, after initiating braking in the above described manner, the wheel brakes react strongly which results in unwanted skidding and then the anti-skid apparatus 3 is activated.

For a first low brake pressure reduction step the 5/3-way valve 83 is brought into a first control position in which it blocks the line 54 and also the line 52 in respect to the pressure supply apparatus 10. The brake valve 9 continues to be connected to the pressure supply apparatus 10. At the same time the 2/2-way valve 84 is blocked so that it, too, blocks the line 52 in respect to the pressure supply apparatus 10. Because of the control positions of both valves 83 and 84 described, no pressure medium flows from the first booster chamber 34 and the auxiliary chamber 36, whereby the first booster piston 5 is hydraulically maintained in the position it had when the undesired skidding occurred. Furthermore, the 3/3-way valve 85 is switched from its normal position to the second control position due to signals from a skid detector, so that the second booster chamber 48 is disconnected from the first booster chamber 34 and is balanced in respect to the pressure supply apparatus 10. Because of this, the brake pressures obtained in the brake circuits I and II cause the pump piston 56 to move in the direction of its initial position with the result that the brake pressures are reduced in these brake circuits I and II. If the brake pressure decrease is sufficient to end the skid, the signal from the skid detector is terminated so that said multiple-position valves 83, 84 and 85 are returned to their original positions and, because of the connection of the second booster cylinder 6 with the first booster cylinder 4 the brake pressures in the brake circuits I and II are again increased. Thereafter, and, if necessary, the same pressure reduction process takes place. It has been assumed in the described brake pressure reduction process that unacceptable skidding occurred simultaneously at all four wheels. In this case all brake pressure maintenance valves 79 to 82 are open during the brake pressure reductions. If, however, skidding which should be stopped, occurs at only one wheel, the skid detector signal to the brake pressure maintenance valve associated with this wheel brake keeps the valve open while the remaining brake pressure maintenance valves are closed. Thus, the prevailing brake pressure behind the closed brake pressure maintenance valves is maintained and the braking forces are only reduced at the unacceptably skidding wheel.

If the brake pressure reductions achievable by means of the second booster piston 7 are not sufficient, i.e. if a higher brake pressure reduction step is necessary, the 5/3-way valve 83 is brought into a third control position wherein it connects the first booster chamber 34 with the return line 87 of the pressure supply apparatus 10 via the line 54. At the same time the pressure supply line 86 of the pressure supply apparatus 10 is connected with the line 52 and thereby also with the auxiliary chamber 36. This results in a pressure change at the first booster piston 5 against the direction of travel of the brake pedal 21 and the stop collar 27 coupled with it. So that the pressure change desired in this manner becomes fully effective, the 5/3-way valve closes the line 43 in the third control position. The back pressure or pressure change results in the first booster piston 5 moving in the direction of the tappet 8. This results in the desired higher brake pressure reduction via the first master cylinder piston 12. The dimensions of the already mentioned spring 90 are such, that small displacements of the first booster piston 5 in the direction of the tappet 8 cause comparatively small reaction forces on the brake pedal 21 via this spring 90 and the stop collar 27. With an increase in the reduction of the brake pressure during the second brake pressure reduction step, the spring 90 will exert an increasingly stronger reaction on the brake pedal 21, very clearly indicating to the driver excessive braking. Finally, if the driver panics and engages the brake pedal exceedingly hard, the spring 90 can be pressed flat so that the movements of the first booster piston 5 are transferred to the pedal 21 undamped via the stop collar 27, the tappet 8, the pedal rod 25 and the brake pedal lever 22. The characteristic force of the spring, already mentioned, is for example chosen in such a manner that, depending on the specific characteristics of the vehicle wheel brakes, over-braking will at first have comparatively unnoticeable results on the brake pedal 21. This is followed by an increasingly noticeable reaction which for example in a physiologically advantageous manner generally increases in the way of an exponential function. The described course of evermore succinct reactions on the brake pedal 21 has the advantage that exceeding the so-called rolling friction limit of the wheels is shown all the more succinctly the more this limit is exceeded and that, at the same time, the driver is requested to reduce brake pressure on his own in order to avoid unnecessary tire wear, for instance. The control valves 88 and 89 include throttles 88 and 89 which are set in such a way that they achieve advantageous pressure flow during reductions in the brake pressure and subsequent increase in the brake pressure along the lines of strong breaking forces as well as of an ability of the vehicle to track correctly during braking.

The anti-skid apparatus 3 is controlled by means of a control apparatus, not shown, which is activated by wheel rpm sensors of known construction, also not shown, supplied with wheel rpm signals. This control apparatus is, for instance, improved in such a way that it determines, based on wheel rpm signals, whether the first described brake pressure reduction step alone or also the second, higher, brake pressure reduction step should be implemented. However, the control apparatus can also make the decision whether the second, higher brake pressure reduction step should be implemented if it continuously measures the brake pressures by means of the brake pressure sensor 18, and, if no reduction in brake pressure is sensed, although it is necessary, starts the second brake pressure reduction step. For the purpose of this, an electrical differentiator having an RC member could be installed between the brake pressure sensor 18 and the control apparatus. It is also possible to perform differentiation by using digitally operating calculators. Further, there is the possibility to combine the brake pressure sensor with a threshold value switch and to supply the initial signals of this threshold value switch to the control apparatus.

The control apparatus can be further improved so that it at least temporarily removes the hydraulic fixation of the first booster piston 5 during the first, low brake pressure reduction steps and, by means of putting pressure on the first booster piston 5 from the direction of the auxiliary chamber 36, moves it partway in the direction of the tappet 8. Because of this a force is exerted via the spring 90 on the stop collar 27, which creates a reaction on the brake pedal 21 via the tappet 8, the pedal rod 25 and the brake pedal lever 22 which also alerts the driver to the operation of the anti-skid apparatus 3. A directed short-time actuation of the multiple-way valves 83 and 84 contained in the first valve arrangement 77 results in that the said travel of the first booster piston 5 remains shorter than the displaced travel of the second booster piston 7. Therefore the first master cylinder 12 and the pump piston 56 can move independently of one another. It is therefore possible to cause displacement of the first booster piston 5 in the direction of the tappet and away from it with a lower time frequency than that time frequency occuring during anti-skid control while using the second booster piston 7.

The second exemplary embodiment of the brake booster 2a is combined with the already described anti-skid apparatus 3, so that there is no need to repeat the description of this anti-skid apparatus with its first valve arrangement 77, the second valve arrangement 78 and of the pressure supply apparatus 10 connected with the first valve arrangement 77.

The brake booster 2a has a first booster cylinder 4a, a first booster piston 5a, a second booster cylinder 6a, a second booster piston 7a, a tappet 8 taken from the first exemplary embodiment and a brake valve 9, also taken from the first example. The brake pedal 21, the brake pedal lever 22 and the pedal rod 25 have also been retained for the operation of the tappet 8. At the side towards the brake pedal, the first booster cylinder 4a has an end wall 23a. This end wall 23a has a bore 91 aligned concentrically to the booster cylinder 4a and through which the tappet 8 can be moved. The end wall 23a again has a sealing ring 26 sealingly surrounding the tappet 8. The booster piston 5a again has sealing rings 19, 20 in the area of its ends which make a seal against the first booster cylinder 4a. Between these sealing rings 19 and 20 there is again a circumferential groove 39 on the first booster piston 5a. As in the first exemplary embodiment, a connecting bore 40 again extends from this circumferential groove 39 and leads to the retained brake valve 9. Opposite from the tappet 8 a plunger 92 is conneceted with the first booster piston 5a. This plunger can be pushed through an end wall 35a of a master cylinder 11a. A sealing ring 38a surrounds the plunger 92 sealingly in the end wall 35a. Inside the master cylinder 11a a first master cylinder piston 12a is disposed. It is connected with a head 68, retained from the first exemplary embodiment, via a stem 93. A casing 69, also retained, surrounds the head 68 and serves to retain a spreading spring 72 mounted between the flange 71 and the first master cylinder piston 12a. The second master cylinder piston 13 also has been retained from the first exemplary embodiment so that a further description of the master cylinder 11a is not required.

The second booster cylinder 6a is located next to the first booster cylinder 4a and has an end wall 94 at the side towards the brake pedal. Concentrically to the second booster piston 7a this end wall 94 has a bore 95, through which extends a piston rod 95 connected with the second booster piston 7a. The end wall 94 has a sealing ring 97 sealingly surrounding the piston rod 96. A spacing between the end wall 94 and the second booster piston 7a defines a second booster chamber 48a. The piston rod 96 has an angled arm 98, the free end 99 of which is disposed parallel to the tappet 8 and is pointed in the direction of the master cylinder 11a towards the first booster piston 5a. The end wall 23a is formed in the shape of a dome 100 in the direction of the piston rod 96 in which are located this piston rod 96 and the arm 98. The line 54 retained from the first exemplary embodiment ends in this dome 100. The also retained line 50 ends in the second booster chamber 48a. The second booster piston 7a is urged by a restoring spring 101 in the direction of the end wall 94. A second piston rod 102 extends inside the restoring spring 101 connecting the second booster piston 7a with a pump piston 103. A pump cylinder 104 is associated with the pump piston 103. It is connected with the brake circuit I and therefore also communicates with the brake pressure sensor 18 connected to the latter which has also been retained from the first exemplary embodiment. Both the second booster piston 7a and the pump piston 103 each support sealing rings 105 or 106. The diameter of the second booster pistons 7a and of its pump piston 103 again are such that they have a higher pressure transmitting ratio than the first booster piston 5a and the first master cylinder piston 12a associated with it. Therefore, when booster pressure is introduced by means of the brake valve 9 into a first booster chamber 34a located between the end wall 23a and the first booster piston 5a and into a second booster chamber 48a communicating with it via a line 54, the 3/3-way valve 85 and the line 50, the second booster piston 7a will always attempt to precede the first booster piston 5a. However, it is prevented from doing so because the arm 98, connected with it via the piston rod 96, is resisted by the first booster piston 5a. As a result, when booster pressure is applied, the first booster piston 5a and the second booster piston 7a move at the same speed, as long as the 3/3-way valve is in its normal position shown. A movement of the first booster piston 5a in the direction of the master cylinder 11a results in pressure medium flowing towards the pressure supply apparatus 10 from an auxiliary chamber 36a located between the first booster piston 5a and the end wall 35a, again by means of a line 52 connected as in the first exemplary embodiment to the retained 5/3-way valve 83. At the same time, as a result of the connection via the second piston rod 102 the pump piston 103 is also displaced in its pump cylinder 104, so that the pump piston 103, simultaneously with the master cylinder piston 12a, displaces medium for the build-up of brake pressure in the brake circuits I and II.

Mode of Operation of the second Exemplary Embodiment

As in the first exemplary embodiment, with the pressure supply apparatus 10 disconnected, the first booster piston 5a can be displaced by means of the brake pedal 21 alone and the first master cylinder piston 12a via the plunger 92 also, for the purpose of creating brake pressure in the brake circuits I and II. The stroke of the brake pedal 21 required for this again is dependent on the diameter of the master cylinder piston 12a. If the pressure supply apparatus 10 is connected, it supplies pressure ahead of the brake valve 9 and, if the brake pedal 21 is actuated, inflow of booster pressure into the first booster chamber 34a and also into the second booster chamber 48a takes place via a displacement of the tappet 8. Since, because of being under booster pressure, the first master cylinder piston 12a and the pump piston 103 now perform pumping functions, the stroke travel of the first booster piston 5a needed for generating a certain brake pressure is shorter than when booster pressure is lacking. The mode of operation of the second brake booster 2a therefore corresponds to that of the first brake booster 2. As already mentioned in connection with this second exemplary embodiment, the anti-skid apparatus 3 is identical to that in the first exemplary embodiment. Reductions in brake pressure are therefore realizable in the same manner and lead, as desired, to reactions on the brake pedal 21.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake booster including a first booster cylinder and an associated first booster piston for the displacement of at least one master cylinder piston of a master cylinder which supplies at least one brake circuit, comprising a tappet means for displacement of said first booster piston by means of a brake pedal, a brake valve coupled to said tappet means, said first booster piston adapted to boost pressure in said master cylinder, an anti-skid apparatus further including at least one valve arrangement, by means of which said boost pressure of said brake booster is reduced in order to minimize skidding, a second booster cylinder supplied with boost pressure from said first booster cylinder and a second booster piston provided with a pump piston for the generation of brake pressure in at least one brake circuit.

2. A brake booster in accordance with claim 1, in which said at least one valve arrangement is disposed in such a manner that, in a first brake pressure reduction with low brake pressure said at least one valve arrangement maintains said first booster piston in its non-braking position in said booster cylinder by hydraulic means and balances said second booster cylinder and said at least one valve arrangement, during higher brake pressure reduction, urges said first booster piston in the direction of the tappet.

3. A brake booster in accordance with claim 2, which includes a brake pressure sensor connected to one of said brake circuits which constitutes an auxiliary means for redirecting said at least one valve arrangement from a control position for said first brake pressure reduction to a control position for said higher brake press reduction.

4. A brake booster in accordance with claim 2, which includes a sensing spring associated with said first booster piston and said tappet which urges said first booster piston in the direction of said tappet when said first booster piston is displaced in the direction of said tappet.

5. A brake booster in accordance with claim 4, in which said sensing spring is disposed as a plate spring.

6. A brake booster in accordance with claim 2, in which said at least one valve arrangement is disposed and controllable such that during a first low reduction in brake pressure, at least one displacement of said first booster piston part of the way towards the tappet takes place.

7. A brake booster in accordance with claim 3, in which said at least one valve arrangement is disposed and controllable such that during a first low reduction in brake pressure, at least one displacement of said first booster piston part of the way towards the tappet takes place.

8. A brake booster in accordance with claim 4, in which said at least one valve arrangement is disposed and controllable such that during a first low reduction in brake pressure, at least one displacement of said first booster piston part of the way towards the tappet takes place.

9. A brake booster in accordance with claim 5, in which said at least one valve arrangement is disposed and controllable such that during a first low reduction in brake pressure, at least one displacement of said first booster piston part of the way toward the tappet takes place.

10. A brake booster in accordance with claim 2 in which said second booster has a larger booster ratio than said first booster piston and includes coupling means which said second booster piston acts on said first booster piston by way of boosting the braking power.

11. A brake booster in accordance with claim 3 in which said second booster has a larger booster ratio than said first booster piston and includes coupling means which said second booster piston acts on said first booster piston by way of boosting the braking power.

12. A brake booster in accordance with claim 4 in which said second booster has a larger booster ratio than said first booster piston and includes coupling means which said second booster piston acts on said first booster piston by way of boosting the braking power.

13. A brake booster in accordance with claim 5 in which said second booster has a larger booster ratio than said first booster piston and includes coupling means which said second booster piston acts on said first booster piston by way of boosting the braking power.

14. A brake booster in accordance with claim 6 in which said second booster has a larger booster ratio than said first booster piston and includes coupling means which said second booster piston acts on said first booster piston by way of boosting the braking power.

15. A brake booster in accordance with claim 7 in which said second booster has a larger booster ratio than said first booster piston and includes coupling means which said second booster piston acts on said first booster piston by way of boosting the braking power.

16. A brake booster in accordance with claim 8 in which said second booster has a larger booster ratio than said first booster piston and includes coupling means which said second booster piston acts on said first booster piston by way of boosting the braking power.

17. A brake booster in accordance with claim 9 in which said second booster has a larger booster ratio than said first booster piston and includes coupling means which said second booster piston acts on said first booster piston by way of boosting the braking power.

18. A brake booster in accordance with claim 10, in which said first and second booster pistons are disposed on the same axis and said coupling means contains an annular collar.

19. A brake booster in accordance with claim 10, in which said first and second booster pistons are disposed in parallel and said coupling means bridge a distance between said first and second booster pistons.

20. A brake booster in accordance with claim 10, in which said at least one valve arrangement is controllable in a manner that during the first brake pressure reduction said first booster piston is displaced at least once part of the way in the direction of the tappet, and one part-way displacement of said first booster piston is shorter than displacements of said second booster piston occurring during said first brake reduction.

21. A brake booster in accordance with claim 1, in which said at least one valve arrangement contains at least one multiple position valve.

* * * * *